United States Patent [19]

Tani et al.

[11] 4,095,217
[45] June 13, 1978

[54] COMBINED LIQUID CRYSTAL DISPLAY AND PHOTOVOLTAIC CONVERTER

[76] Inventors: Hirotsugu Tani; Kyoji Taguchi; Shigeru Arita, all of 251 E. Victoria Ave., Carson, Calif. 90746

[21] Appl. No.: 775,261

[22] Filed: Mar. 7, 1977

[51] Int. Cl.² .............................................. G06F 3/14
[52] U.S. Cl. .............................. 340/324 R; 58/23 C; 58/50 R; 340/336; 350/332
[58] Field of Search ............................. 58/50 R, 23 C; 350/160 LC; 340/324 R, 324 M, 336

[56] References Cited

U.S. PATENT DOCUMENTS

| | | | |
|---|---|---|---|
| 3,499,112 | 3/1970 | Heilmeier et al. | 350/160 LC |
| 3,505,804 | 4/1970 | Hofstein | 350/160 LC |
| 3,546,469 | 12/1971 | Lemovic | 58/50 R |
| 3,613,351 | 10/1971 | Walton | 58/23 C |

Primary Examiner—Marshall M. Curtis
Attorney, Agent, or Firm—Bruce L. Birchard

[57] ABSTRACT

By replacing the passive reflector in a liquid crystal display with a photovoltaic converter, the dual results of light reflection for display visibility and electrical energy generation for operation of the display and associated circuitry, such as electronic calculator circuitry, are achieved.

10 Claims, 6 Drawing Figures

COMBINED LIQUID CRYSTAL DISPLAY AND PHOTOVOLTAIC CONVERTER

BACKGROUND OF THE INVENTION

1. Field of the Invention

This invention relates to electronic devices, such as electronic calculators, which are battery operated and incorporate one or more liquid crystal displays.

2. Description of the Prior Art

With the advent of integrated circuits, particularly Large Scale Integrated Circuits (LSI's) vast new potential markets have been opened for miniaturized electronic devices, such as electronic calculators and digital watches. These devices are battery operated and consume amazingly small electrical power. For example, a hand-held electronic calculator may consume only 0.5 milliwatts when operating. The batteries presently used to operate such devices are silver oxide batteries which have relatively large milliampere-hour capacity in a small volume. Such batteries have been used for years in hearing aids.

There are two types of digital displays used in such calculators and in electronic watches. Those two types of displays are Light Emitting Diodes (LED's) and Liquid Crystal Displays (LCD's). LED's rely upon light emitted from a $p$-$n$ junction in a semiconductor material, such as galium arsenide, when a voltage of the proper magnitude and polarity is applied across the junction.

LCD's rely upon a completely different phenomenon. Certain molecules, called nematic molecules, exhibit solid crystal characteristics, such as light polarization and electromagnetic vector rotation, when an electrical potential appears across the liquid. By combining shaped electrodes, light polarizing sheets and a reflector, light incident upon the display can be selectively reflected, i.e., in accordance with the disposition of the electrodes to which an electrical potential has been applied. The light which is not reflected is simply unused and lost through absorption or otherwise. The power required to orient the liquid crystals is miniscule. Further, as has been indicated, the power to operate the logic circuits is also miniscule.

Therefore, it is an object of this invention to provide a combined liquid crystal display and photovoltaic converter which will self-power the display and its associated circuits, with or without battery storage capability.

It is a still further object of this invention to provide a digital display-power generating device which utilizes substantially all of the light incident upon it.

It is an additional object of this invention to provide a self-powered electronic calculator.

It is a still further object of this invention to provide a self-powered electronic watch.

SUMMARY OF THE INVENTION

Stated briefly, by replacing the passive reflector in a liquid crystal display, with a photovoltaic converter, such as a silicon solar cell, any light which is not reflected to make the read-out information visible to the viewer it converted to electricity to operate the display and its associated electronic circuits, whether they be calculator circuits, time indicating circuits or otherwise.

BRIEF DESCRIPTION OF THE DRAWINGS

A better understanding of the present invention may be had from a consideration of the following detailed description, taken in conjunction with the accompanying drawings, in which.

DETAILED DESCRIPTION OF THE PREFERRED EMBODIMENT

Figure 1A:
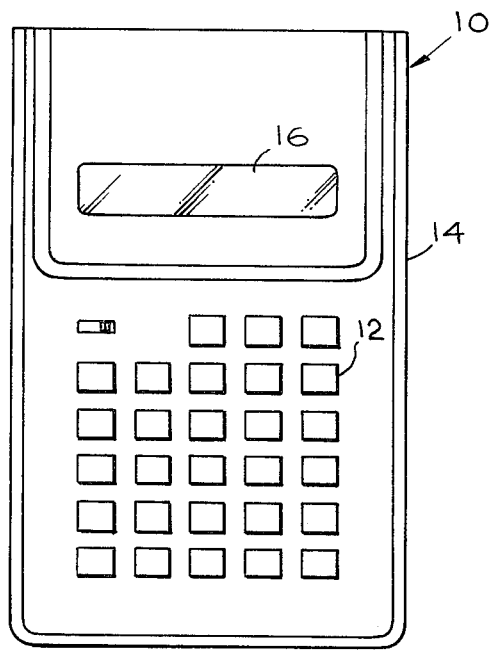
FIG. 1A is a plan view of an electronic calculator incorporating the present invention.
Figure 1B:
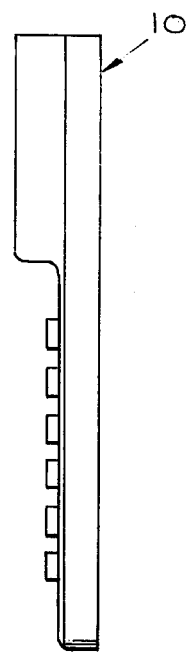
FIG. 1B is a side view of the calculator of FIG. 1A.

In FIG. 1A, electronic calculator 10 has keyboard 12, case 14 and display 16. The side view of FIG. 1B emphasizes the thin profile which has been achieved in such electronic devices through the use of integrated circuits, particularly LSI's.

Figure 2:
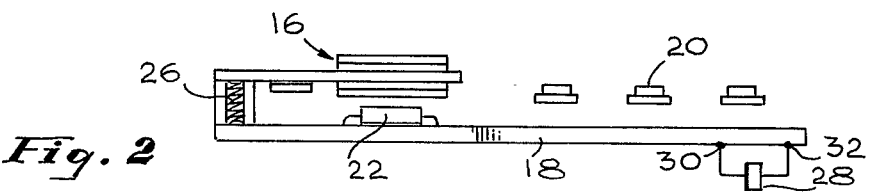
FIG. 2 is a schematic representation of certain of the internal components of the device of FIGS. 1A and 1B.

In FIG. 2, case 14 has been removed and essential components of calculator 10 are shown. Printed circuit board 18 acts as a mechanical support for the other electronic elements such as keys 20, LSI 22, which contains the logic elements for the calculator, and liquid crystal display 16 which is secured to and electrically connected to printed circuit board 18, in appropriate fashion, by electrically-conductive elastomeric material 26. A source of electromotive force 28, such as primary, secondary or solar cell, or some combination thereof, is connected to input terminals 30 and 32 on board 18.

Figure 3:
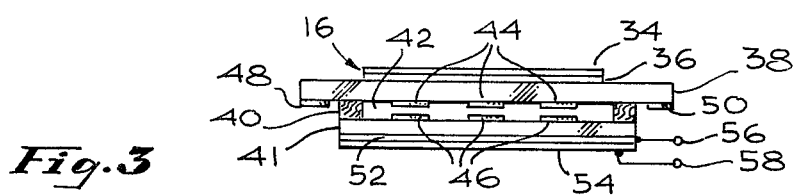
FIG. 3 is an elevation view, partially sectioned, of the display portion of FIG. 2, showing the disposition of certain elements therein according to this invention.

The structural details of the display 16, according to this invention, are set forth in FIG. 3. Filter 34 is a neutral density filter having the characteristics of reducing, at its upper surface, reflection of ambient light. This filter improves the contrast ratio of the display making it more legible to the user. This filter may be of glass or plastic.

Filter 34 is secured to first polarizer 36 which converts randomly polarized ambient light into light of a desired polarization, as will be more thoroughly described in connection with the description of FIG. 4.

Upper glass plate 38 and lower glass plate 41 are spaced from each other by liquid seal 40 to enclose a nematic liquid 42. Such liquid is available from several sources and its composition does not constitute a part of this invention. Suffice it to say that such nematic liquid has light-polarity-vector rotating capability.

Upper and lower sets of transparent electrodes, 44 and 46, respectively, (which can be formed by stannous oxide, or the like) are disposed on upper and lower glass plates 38 and 41, respectively and connected to respective electrical terminals 48 and 50. These terminals 48 and 50 may also be transparent to light.

Figure 4:
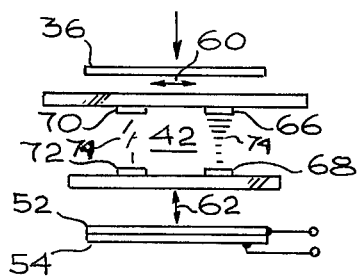
FIG. 4 is a schematic representation of the display of FIG. 3, showing the theory of liquid crystal display operation; and, FIG. 5 is a schematic diagram of an electrical circuit contemplated by this invention.

An additional polarizing sheet 52 is applied to the sub-surface of lower glass plate 41 to pass only light with a predetermined polarity, as is described more fully in connection with the description of FIG. 4.

Beneath polarizing sheet 52 a reflector 54 is provided to send back through the display and out to the viewer light of the proper polarity. In prior art devices reflector 54 was merely a piece of aluminum foil and served only a passive function. In this invention reflector 54 is a photovoltaic converter, for example a silicon solar cell which converts to electricity all that light which is not reflected back through the display 16. The operation of a silicon solar cell is well understood and need not be dwelt upon at length here except to say that a potential of 0.5 volts is generated across a silicon solar cell so several such cells, or cell segments on a single silicon substrate, must be connected in series to achieve the necessary operating voltage, say 1.5 volts, for the associated calculator (or watch). The operating current available from a silicon solar cell varies substantially directly with the area of the cell, so segmenting a cell to get higher voltage results in lower available current. However, with a typical electronic calculator utilizing LSI circuitry the operating current may be as low as 160 microamperes, a minute current which is easily obtained from a small-area silicon solar cell, even under fluorescent light which is low in energy in the infra-red spectrum where silicon solar cells are most sensitive. Other photovoltaic converters may be used, of course. The potential generated by reflector-converter 54 appears at terminals 56, 58.

The mechanism of liquid crystal displays will be explained briefly in connection with FIG. 4. Light of random polarity incident upon polarizer 36 produces light output from the polarizer with a polarity indicated by the horizontal arrow 60 in FIG. 4. The nematic liquid 42, when not subject to a potential, rotates the polarized light from filter 36 by 90°, as is indicated by arrow 62. Polarizing sheet 52 passes the light energy so polarized to the upper surface of solar cell 54 where it is reflected, in part, and passes back through the polarizing system to emerge as a bright image, the shape of which is determined by the configurations of electrode sets 44 and 46. The bright image conditions are represented by electrodes 66 and 68 in FIG. 4 between which electrodes no potential difference exists. On the other hand the black or non-image conditions are represented by electrodes 70 and 72, between which a potential difference exists. Such potential difference results in a vertical orientation of the liquid crystals 74 and, consequently, no twisting of the polarization of the light passing through electrodes 70, 72 and failure of such light to pass through polarizing sheet 92 to the reflecting surface of photovoltaic converter 54. Thus, segments or electrodes 70 and 72 produce a dark region as viewed from the upper surface of LCD 16. By properly designing electrode sets 44 and 46 any desired alphanumeric pattern may be developed and the desired display may be realized. At the same time, any light which is not reflected is converted (at a predetermined efficiency around 10%) to electricity for storage or direct operation of the equipment.

Figure 5:
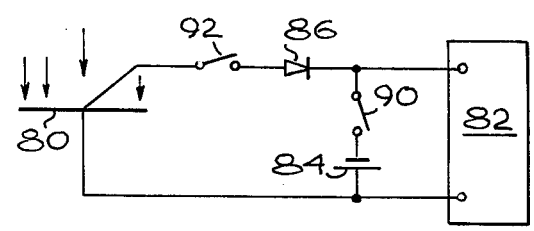

In FIG. 5, light impinging on solarcell 80 is converted to electricity which may be used to operate the electronic device 82 (such as a calculator or watch) directly or in conjunction with a rechargeable battery 84. If a rechargeable battery is used a diode 86 must be included in the circuit, with appropriate polarity, to prevent discharging the battery through the solar cell when no light is impinging on the cell.

With switch 90 closed and switch 92 open electronic apparatus 82 is operating directly off solar cell array 80. With switch 90 closed and switch 92 closed, apparatus 82 operates off battery 84 unles solar cell panel 80 is generating voltage and current sufficient to override battery 84.

While particular embodiments have been shown and described it will be evident to those skilled in the art that variations and modifications of those embodiments which have been described may be made without departing from this invention. It is the purpose of the appended claims to cover all of those variations and modifications, as well as the embodiments shown and described.

What is claimed is:

1. A combination liquid crystal display and electrical generator, including:
    a liquid crystal chamber having a first and a second transparent wall and containing liquid crystal material;
    first transparent electrodes of a predetermined shape carried by said first transparent wall;
    second transparent electrodes of a predetermined shape carried by said second transparent wall and juxtaposed to said first transparent electrodes; and,
    combination light reflector and photovoltaic conversion means positioned along said second transparent wall in line with the lightpath through, sequentially, said first transparent wall, said liquid crystal material and said second transparent wall.

2. Apparatus according to claim 1 which includes, in addition, electrical output terminals on said reflector means and electronic apparatus coupled to said output terminals.

3. Apparatus according to claim 2 in which said electronic apparatus is calculating apparatus.

4. Apparatus according to claim 3 in which said calculating apparatus is electrically coupled to said liquid crystal display.

5. Apparatus according to claim 2 in which said liquid crystal display and said electronic apparatus obtain their operating power from said reflector means having photovoltaic capabilities.

6. Apparatus according to claim 1 in which said reflector means includes a silicon photovoltaic converter.

7. Apparatus according to claim 6 in which said silicon converter includes a *p-n* junction with the *p*-type silicon being the reflector means.

8. Apparatus according to claim 3 in which said electronic apparatus is time measuring apparatus.

9. Apparatus according to claim 1 in which said first and second transparent electrodes are shaped to produce alpha-numeric images on said liquid crystal display.

10. Apparatus according to claim 2 in which said electronic apparatus includes a storage battery.

* * * * *